United States Patent [19]
Keitel et al.

[11] Patent Number: 5,348,463
[45] Date of Patent: Sep. 20, 1994

[54] INJECTION UNIT HAVING ADJUSTABLE AND SETTABLE NOZZLE CONTACT PRESSURE

[75] Inventors: Ralph Keitel, Kenzingen, Fed. Rep. of Germany; Bruno Stillhard, St. Gallen, Switzerland

[73] Assignee: Klockner Ferromatik Desma GmbH, Malterdingen, Fed. Rep. of Germany

[21] Appl. No.: 74,619

[22] Filed: Jun. 11, 1993

[30] Foreign Application Priority Data

Jun. 11, 1992 [DE] Fed. Rep. of Germany ....... 4219081
Sep. 29, 1992 [DE] Fed. Rep. of Germany ....... 4232533

[51] Int. Cl.$^5$ ...................... B29C 45/07; B29C 45/20; B29C 45/76
[52] U.S. Cl. .................................. 425/145; 425/135; 425/569; 425/574; 425/258
[58] Field of Search ............... 425/569, 574, 575, 576, 425/135, 145, 258

[56] References Cited

U.S. PATENT DOCUMENTS

| 4,427,353 | 1/1984 | Omiya et al. | 425/569 |
| 4,676,730 | 6/1987 | Yamasaki | 425/574 |
| 4,950,144 | 8/1990 | Watanabe et al. | 425/135 |
| 5,147,659 | 9/1992 | Watanabe et al. | 425/145 |

FOREIGN PATENT DOCUMENTS

| 60-259419 | 12/1985 | Japan | 425/574 |
| 61-76334 | 4/1986 | Japan | 425/574 |
| 62-73921 | 4/1987 | Japan | 425/574 |
| 62-85915 | 4/1987 | Japan | 425/574 |

*Primary Examiner*—Khanh Nguyen
*Attorney, Agent, or Firm*—Watson, Cole, Grindle & Watson

[57] ABSTRACT

A device for generating nozzle contact pressure for the nozzle of a plasticizing and injection unit includes a spindle drive system and a measuring sensor to detect when an appropriate nozzle contact pressure has been achieved. The device generates nozzle contact pressure and also makes it possible to adjust and set the contact pressure of the nozzle.

7 Claims, 2 Drawing Sheets

INJECTION UNIT HAVING ADJUSTABLE AND SETTABLE NOZZLE CONTACT PRESSURE

BACKGROUND OF THE INVENTION

The present invention relates to a device for generating contact pressure of a plasticizing and injection unit nozzle against a mold half, wherein the mold half is provided on a stationary platen. More particularly, the present invention relates to such a device which exhibits compression springs and a spindle drive, wherein the spindle drive is arranged between the stationary platen and the displaceable plasticizing and injection unit.

Devices for generating a nozzle contact pressure are known from European Patent Application No. 0 328 671 A1. The compression springs of this known device are arranged around the individual rods of a rod assembly. The rod assembly is connected to a plate which serves, on the one hand, as one of the spring bearings, and., on the other hand, is connected to a nut of the spindle drive by way of intermediate elements. The spring system is free and is subjected to operational and atmospheric interference. In addition, the rods and the compression springs arranged around the rods are guided through a plate. The spindle passes through the same plate, thus, the plate forms the other spring bearing and is connected stationarily to the plasticizing and injection unit.

The present invention is based on the problem of making the design of the spindle drive and other elements of the device simple. More particularly, the present invention relates to a device wherein compression springs are mounted operationally and to avoid, or minimize, the varying adverse effects on the spring elements.

SUMMARY OF THE INVENTION

To avoid the aforementioned problems, the present invention provides a device which guides the spindle drive through a face plate of a housing which is connected to the displaceable plasticizing and injection unit. The present invention also provides at least one compression spring in an axially displaceable, cup-shaped mounting on the spindle between the face plates in the direction of the spindle drive. Additionally, the present invention provides means of locking an axially displaceable nut against rotation by using an adjusting spring on the side the cup-shaped mounting that faces away from the spindle drive.

When plasticized material is injected into the cavity of an injection mold, pressure builds up in the cavity, which can result in the nozzle of the plasticizing and injection unit being lifted up. To prevent this, the present invention provides a device which not only generates a nozzle contact pressure, but also makes it possible to adjust and set the contact pressure of the nozzle.

According to a first embodiment of the invention, the housing connected to the displaceable plasticizing and injection unit has a switch, which can be operated by means of the cup-shaped mounting. In so doing, the switch serves as a signal generator for the start of compression of the compression spring. The Limit compression can be adjusted in such a manner that it corresponds a predetermined nozzle contact pressure.

According to another embodiment of the present invention, the tripping signal for the compression of the compression spring is generated by a surge in the electric current of a servo motor, which is produced at the start of compression by increasing the load on the motor.

If the tripping switch is arranged in a housing, it advantageous to arrange the switch in the region of the floor the cup-shaped mounting so that it is easy to access and replace. Herein the "floor" of the cup-shaped mounting refers to what would be considered the bottom of the cup-shape if the cup-shaped mounting were sitting upright with its opening facing upward. In the embodiment of the present invention depicted in FIG. 2, the cup-shaped mounting is not sitting upright, but instead has its opening facing the left hand side of the Figure.

According to yet another aspect of the present invention, the compression springs may be cupped springs.

The invention may be more fully understand with reference to the accompanying drawings and the following description of the embodiments shown in those drawings. The invention is not limited to the exemplary embodiments but should be recognized as contemplating all modifications within the skill of an ordinary artisan. The invention is shown in the drawing with reference to an embodiment where a switch is provided in the housing of a spindle drive.

DESCRIPTION OF THE INVENTION

Figure 1:
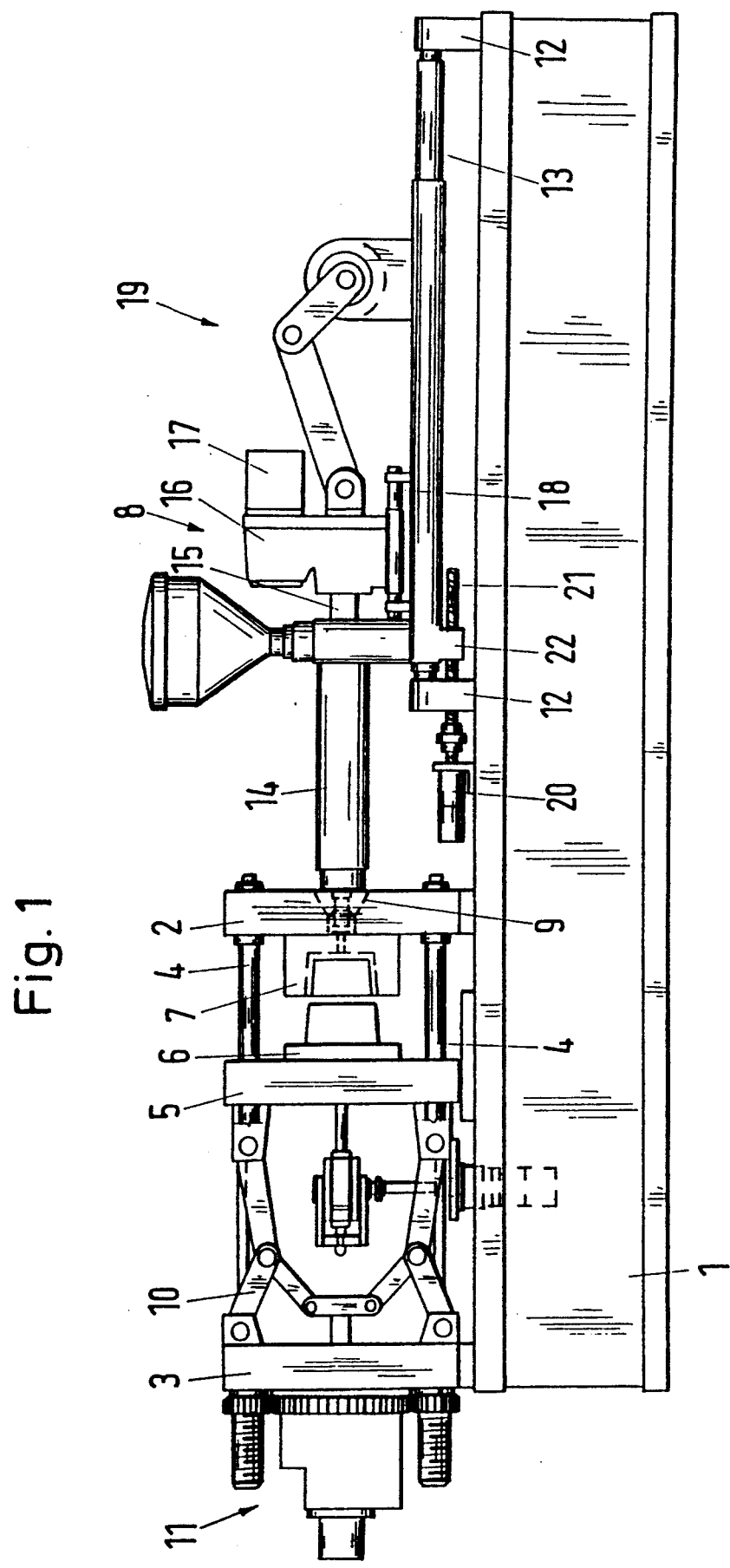
FIG. 1 is a side view of an injection molding machine.

Two stationary supporting plates 2 and 3 and columns 4, of which only the two front columns are visible, form a guide for a displaceable platen 5 with a displaceable mold half 6. The stationary supporting plates 2 and 3 are mounted on a machine frame 1.

The supporting plates 2 serves in a well known manner as the stationary platen for stationary mold half 7. Against the gate of mold half 7, the nozzle of a plasticizing and injection unit 8 is applied. To this end, the stationary platen 2 exhibits a passage 9.

Between the supporting plate 3 and the displaceable platen 5 there is a toggle lever 10, which in combination with the electric drive 11, forms a closing system. The details of such a closing system are well-known and are not specifically addressed herein.

To move the plasticizing and injection unit 8, the machine frame 1 has abutments 12 and two columns 13, wherein an end of each column is connected to each abutment. Only the front column 13 of the two columns is visible in the Figures. The plasticizing and injection unit 8 can be moved on, and is guided by, the two columns 13.

The plasticizing and injection cylinder is shown as reference numeral 14. The shaft 15 of the plasticizing and injection screw is mounted in the housing 16 of the rotational drive 17 of the plasticizing and injection unit. The housing 16 of the rotational drive can be moved on the columns 18 and is coupled to a crank gear 19. The crank gear 19 moves the housing 16 during the injection phase and thus moves the plasticizing and injection screw.

The spindle drive 20 for the plasticizing and injection unit comprises a servo motor and a driven spindle 21. The driven spindle 21 is led through the one abutment 12 and is, furthermore, led through the housing 22 of the device to generate nozzle contact pressure. The housing 22 is firmly connected to the plasticizing and injection unit 8.

The spindle drive is arranged stationarily between the stationary platen and the plasticizing and injection unit on the machine frame 1.

Figure 2:
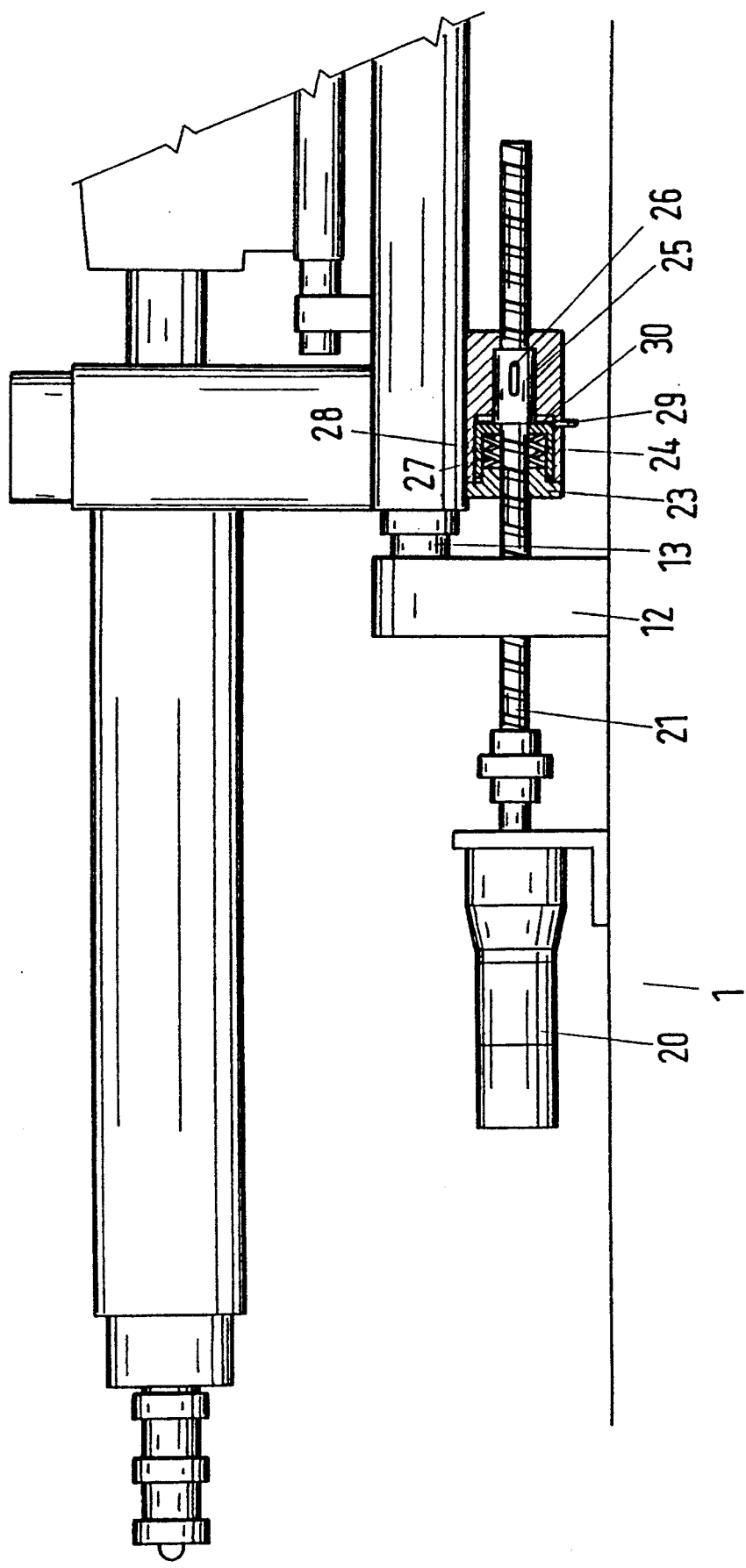
FIG. 2 shows an enlarged portion and partial cutaway view of the device of FIG. 1.

As best seen in FIG. 2, the housing 22 comprises a face plate 23, a cup-shaped mounting 24 which opens in the direction of the face plate 23, and a nut 25. The spindle is guided through the face plate 23 and through the cup-shaped mounting 24 and engages the nut 25 according to the principle of a nut and screw. The nut 25 has an oblong hole which reveals an adjusting spring 26 to lock the housing against rotation.

The compression spring 27, which is braced against the face plate 23 and against the inner floor 28 of the cup-shaped housing, is arranged in the cup-shaped mounting 24.

The switch 29 is disposed in the wall of the housing 22. The switch 29 may be of the type which functions without making contact. For example, the switch 29 may function as a magnetoresistor. Starting from a minimum distance of the outer floor 30 of the cup-shaped mounting 24, the magnetoresistor sends an output signal.

In operation, the device functions as described below.

Prior to injecting the plasticized material, the nozzle of plasticizing and injection unit is pressed against the stationary mold half. As a consequence of rotating the spindle 21, the nut 25 is moved to the left in the drawing of FIG. 2. Owing to this displacement of the cup-shaped mounting, the distance of the floor 30 of the cup-shaped mounting changes relative to the measuring sensor of switch 29. When the measuring sensor is a magnetoresistor, an accompanying change in magnetic field detected. This change leads to an output signal. Given the pitch of the threaded spindle, the gear ratio, and the steps of the servo motor in the spindle drive, the additional amount of rotation of the spindle necessary to achieve a specific nozzle contact pressure, can be determined.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed is:

1. A device to generate the contact pressure of a nozzle of a displaceable plasticizing and injection unit against a mold half provided on a stationary platen, said device comprising:

a compression spring, a housing assembly for said compression spring connected to said plasticizing and injection unit, a spindle disposed through said compression spring, a spindle drive connected to said spindle for rotating same, and a switch on said housing assembly having a measuring sensor to generate a signal used to control compression of the compression spring, said spindle drive being arranged between the stationary platen and the displaceable plasticizing and injection unit, said housing assembly comprising a hollow housing, a face plate covering one end of the hollow housing, an axially displaceable cup-shaped element which opens in the direction of the face plate and which has a base wall having an inner surface and an outer surface, and an axially displaceable nut, said spindle passing through said face plate, passing through said cup-shaped element, and threadably engaging said nut, said axially displaceable nut capable of being locked against rotation by an adjusting spring within the nut, said cup-shaped element being axially displaceable along said spindle within said hollow housing, wherein a relative distance between the outer surface of the base wall and the measuring sensor changes upon compression of said spring, and the switch generates a signal to drive said spindle and compress the spring until a predetermined distance between the outer surface and the measuring sensor is achieved, at which point said switch ceases to generate said signal.

2. A device as defined in claim 1, wherein said compression spring is a cupped spring.

3. A device as defined in claim 1, wherein said switch includes a magnetoresistor.

4. The device as defined in claim 1, wherein the housing has a switch which can be operated by the cup-shaped mounting and serves as a signal generator for the start of the compression of the compression spring.

5. The device as defined in claim 1, wherein the compression springs are cup springs.

6. A device to generate contact pressure of a nozzle of a displaceable plasticizing and injection unit against a mold half provided on a stationary platen, said device comprising:

a compression spring, a housing assembly for said compression spring connected to said plasticizing and injection unit, a spindle disposed through said compression spring, a spindle drive connected to said spindle for rotating same, and a signal generating member on said housing assembly to generate a signal used to control compression of the compression spring, said spindle drive being arranged between the stationary platen and the displaceable plasticizing and injection unit, said housing assembly comprising a hollow housing, a face plate covering one end of the hollow housing, an axially displaceable cup-shaped element which opens in the direction of the face plate and which has a base wall having an inner surface and an outer surface, and an axially displaceable nut, said spindle passing through said face plate, passing through said cup-shaped element, and threadably engaging said nut, said axially displaceable nut capable of being locked against rotation by an adjusting spring within the nut, said cup-shaped element being axially displaceable along said spindle within said hollow housing, wherein a relative distance between the outer surface of the base wall and the measuring sensor changes upon compression of said spring, and the signal generating member generates a signal to drive said spindle and compress the spring until a predetermined distance between the outer surface and the signal generating member is achieved, at which point said signal generating member ceases to generate said signal.

7. The device as defined in claim 6, wherein a tripping signal for the compression of the compression spring is generated by a surge in electric current of a servomotor for the spindle drive, wherein said surge is produced at the start of compression by increasing load on the servomotor.

* * * * *